July 17, 1962  W. B. DEAN ETAL  3,044,822
AUTOMOBILE BODY FRONT END CONSTRUCTION
Filed Nov. 8, 1960  4 Sheets-Sheet 1

INVENTORS.
Walter B. Dean
Henry W. Wessells III
BY
Wm. R. Glisson
ATTORNEY

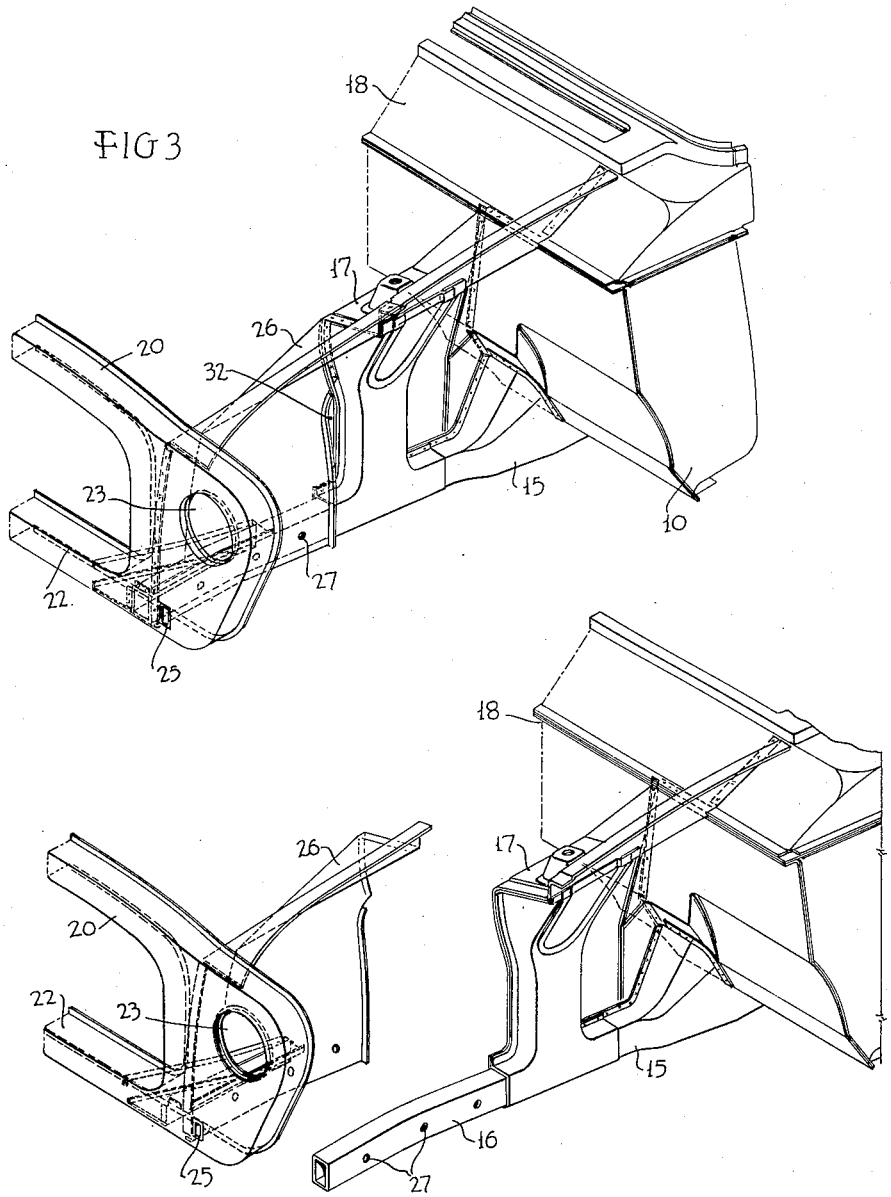

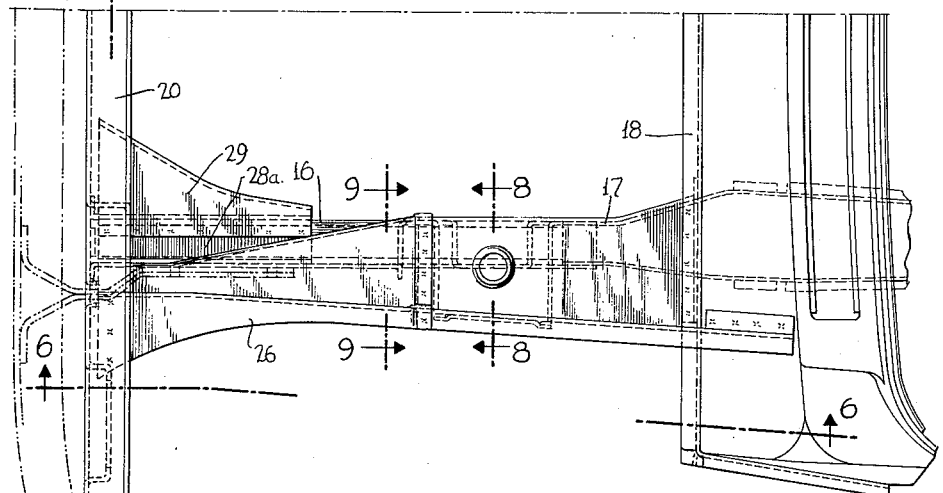
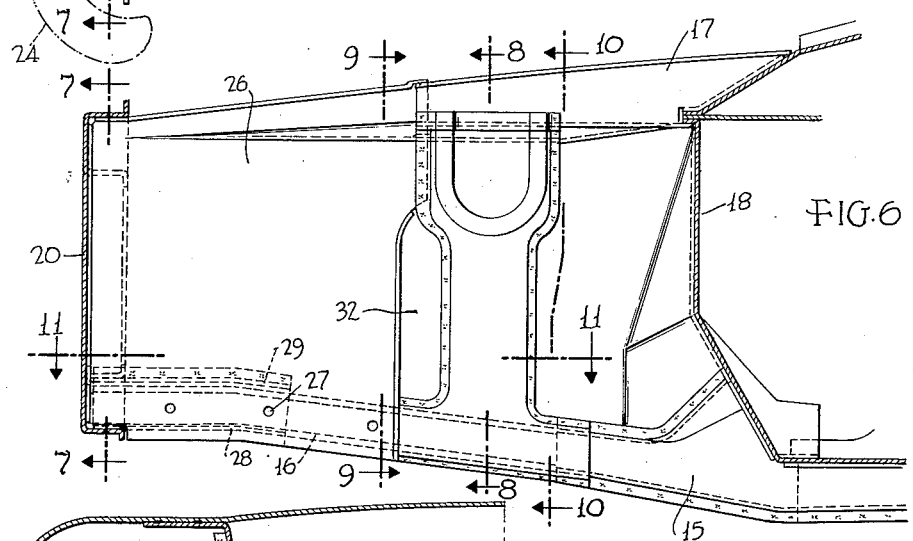

July 17, 1962  W. B. DEAN ETAL  3,044,822
AUTOMOBILE BODY FRONT END CONSTRUCTION
Filed Nov. 8, 1960  4 Sheets-Sheet 4
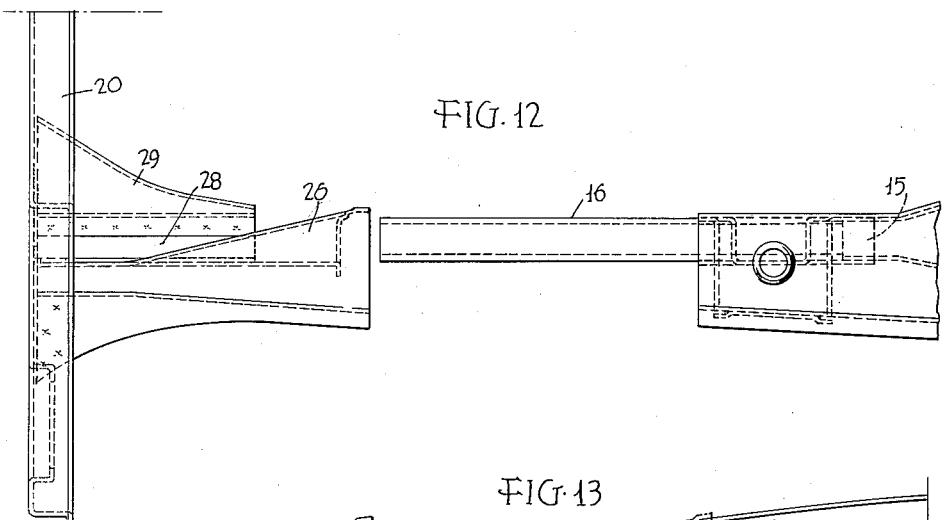
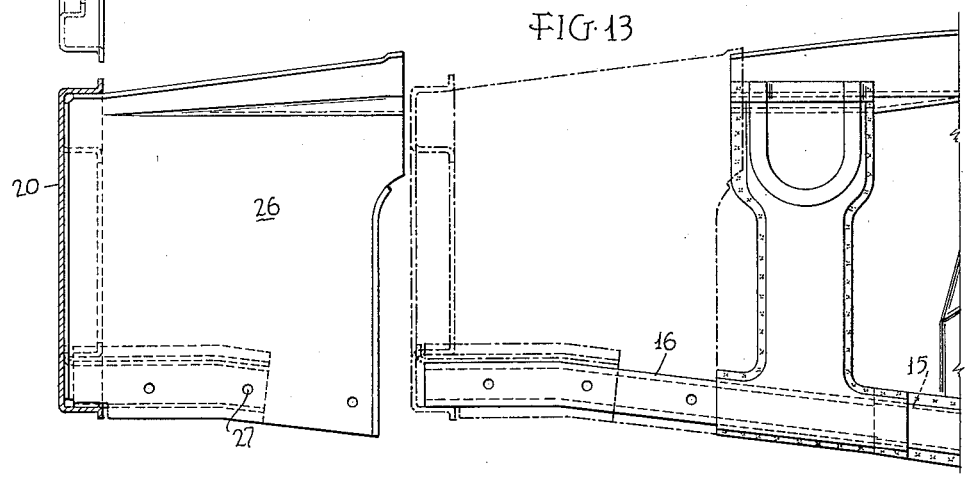
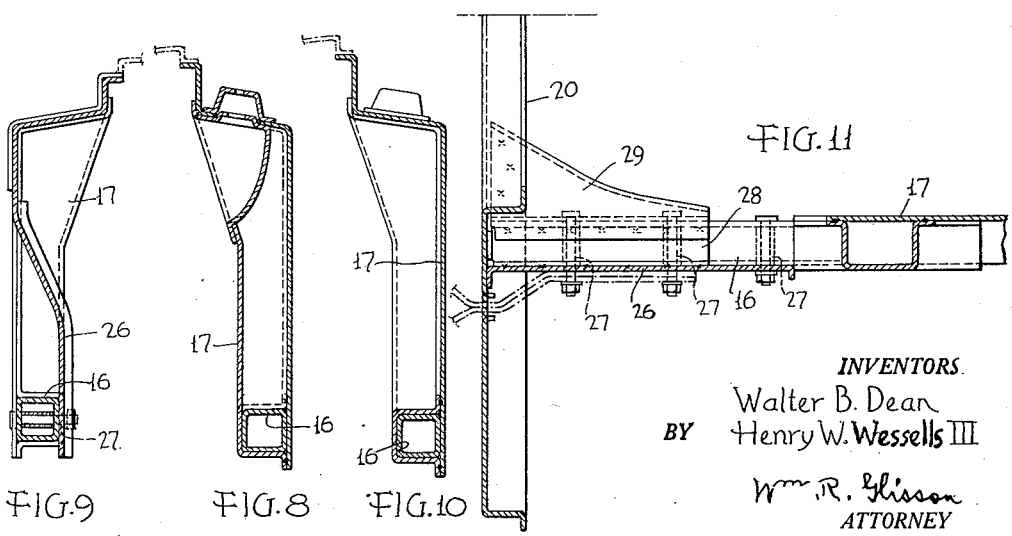
INVENTORS.
Walter B. Dean
Henry W. Wessells III
BY
Wm. R. Glisson
ATTORNEY United States Patent Office 3,044,822
Patented July 17, 1962

3,044,822
AUTOMOBILE BODY FRONT END
CONSTRUCTION
Walter B. Dean, Narberth, and Henry W. Wessells III, Ardmore, Pa., assignors to The Budd Company, Philadelphia, Pa., a corporation of Pennsylvania
Filed Nov. 8, 1960, Ser. No. 68,084
4 Claims. (Cl. 296—28)

This invention relates to automobile unit body front end construction, especially to a unit front end assembly which is separately fabricated and attached after the main body assembly and mechanical installations have been completed, and has for an object the provision of improvements in this art.

One of the particular objects of the invention is to facilitate the installation of engine, suspension and other components behind the front grill; and to facilitate access for their repair or replacement, if desired.

Another object is to provide convenient sub-assembly units to economically distribute manufacturing labor and time.

Another object is to provide a light weight front end unit assembly which greatly assists in strengthening and rigidifying the body structure after it is installed.

Another object is to provide sub-assembly units which reduce the final assembly costs.

Another object is to provide a front end sub-assembly unit which can easily and quickly be removed for repairs, the front end being the part of the car most frequently damaged in collisions.

The above and other objects and advantages of the invention will be apparent from the following description of an exemplary embodiment thereof, reference being made to the accompanying drawings wherein:

FIG. 3 is an enlarged isometric view of the assembled parts, with the fender omitted;

FIG. 4 is a view similar to FIG. 3, but showing the parts before assembly;

FIG. 5 is a top plan view of the parts shown in FIGS. 3 and 4, a bumper and its mounts being shown in broken lines to show how it fits into the assembly;

FIG. 6 is a vertical longitudinal section taken on the line 6—6 of FIG. 5;

FIG. 7 is a vertical transverse section taken on the line 7—7 of FIGS. 5 and 6;

FIG. 8 is a vertical transverse section taken on the line 8—8 of FIGS. 5 and 6;

FIG. 9 is a vertical transverse section taken on the line 9—9 of FIGS. 5 and 6;

FIG. 10 is a vertical transverse section taken on the line 10—10 of FIG. 6;

FIG. 11 is a horizontal section taken on the line 11—11 of FIG. 6;

FIG. 12 is a plan view of parts in position for assembly on the front stub rail; and FIG. 13 is an elevation of the parts shown in FIG. 12.

Figure 1:
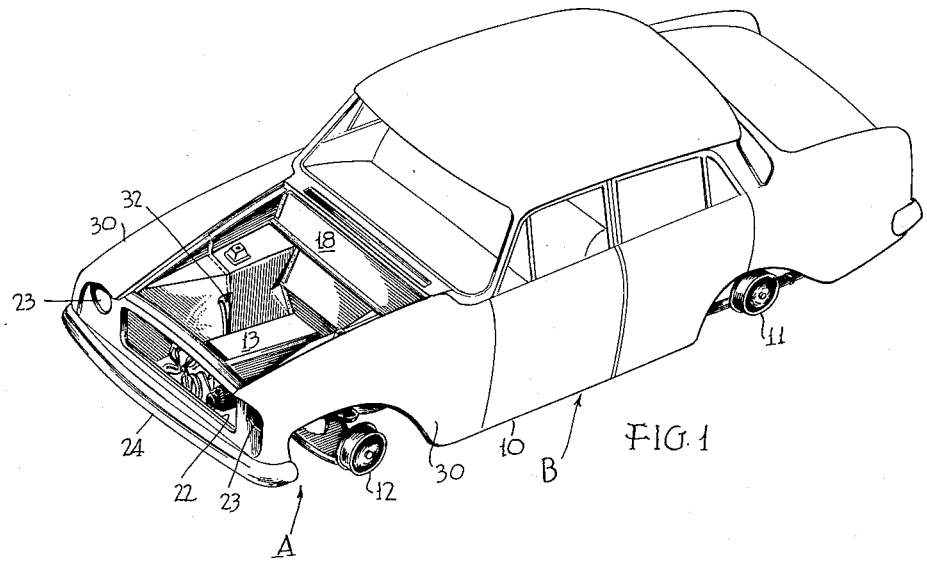
FIG. 1 is a side and front end isomeric view of an automobile body made according to the present invention.
Figure 2:
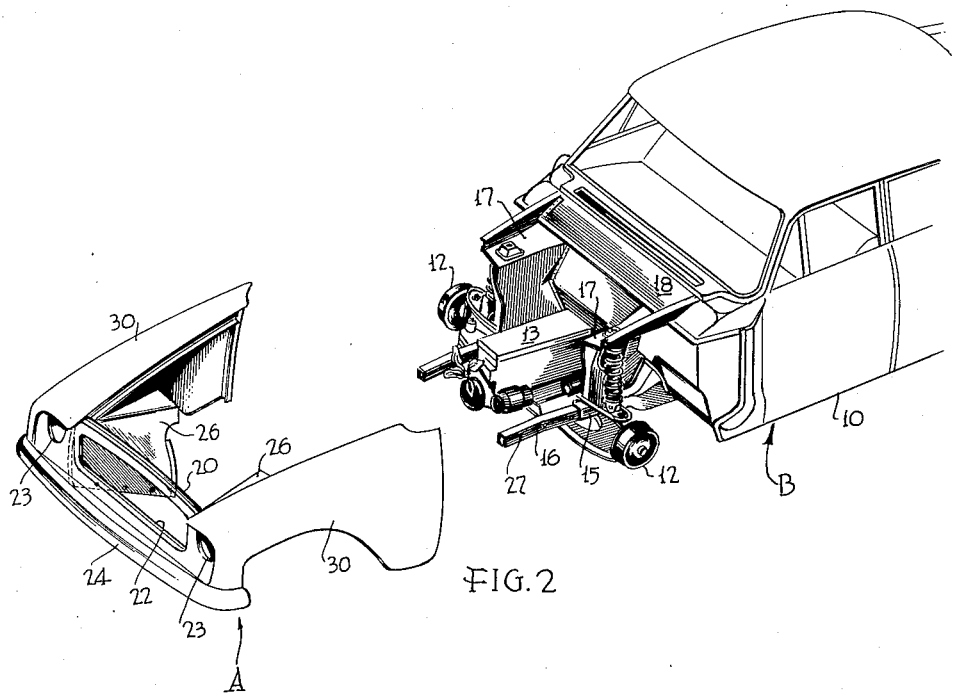
FIG. 2 is a similar isometric view showing the front end assembly before installation.

As shown in the drawings, a separately fabricated front end assembly A is provided for a main body assembly B. The main body assembly unit B is of the unit body (no separate chassis) type and is so complete within itself that it could be run briefly without the front end unit being installed. That is to say, it comprises a completely finished, upholstered and instrumented body 10, rear wheel mounts 11, front wheel mounts 12 (with wheels also, if desired; although the wheels are omitted here for clarity of illustration of body components), and engine 13 with all accessories except the radiator and coolant connections and headlamps.

The main body assembly includes on each side a front stub rail 15 which is attached to the front floor pan, connecting the front seat cross member and toe board and having a stub rail extension 16 which provides support for the front end assembly A which is added in final assembly. A wheel housing component 17 with reinforcements and attachments is secured to the front stub rail 15 and to the rigid cowl structure 18. The front wheel suspension is carried complete by the front stub rail and wheel housing.

The front end unit A includes a rigid transverse stamping 20 with deep flanges on all edges which forms a strong transverse connection in the final assembly. Upon it are mounted a radiator (not shown), a grill secured in an opening 22 and headlamp units secured in openings 23. A bumper 24 fits the lower portion of the front assembly and may be carried with it but, preferably has the usual rearwardly extending arms which extend through apertures 25 in the stamping 20 and are connected to the stub rail extensions 16 by the same means which are used to connect the front end unit to the stub rail extensions.

To the rear of the stamping 20 on each side there are secured, as by welding, wheel housing components 26 which fit on the stub rail extensions and are secured thereto, as by bolts (FIGS. 9, 11) in holes 27. The same bolts secure the bumper arms mentioned above. The wheel housing component 26 is reinforced at the bottom by a gusset member 28 which is of general Z-shape and has a plate 29 secured, as by welding, to its top horizontal web 28a. The intermediate web 28b, in assembly, flanks one side of the stub rail extension 16; the bottom of the wheel housing component 26 flanks the other side; and the top web 28a and the plate 29 overlie the top of the stub rail extension. The bottom web flanks and is welded to a horizontal flange of the stamping 20. The gusset members 28 have flanges by which they are secured, as by welding, to the wheel housing component 26 and to the stamping 20.

Front fenders 30 are secured, as by welding, to the stamping 20 and to the wheel housing component 26. In final assembly the fenders 30 are secured, as by bolts, screws or welding, to the top of the wheel housing component 17 and to the A post of the main body assembly.

The front end assembly, when connected in final assembly, greatly braces and rigidifies the front end of the body; before it is assembled there is full access to the motor and accessories and structures of the main body assembly.

The forward component 26 of the wheel housing overlaps the rearward component 17 at the top but therebelow the components are spaced apart to provide an air circulating space 32.

The front end assembly itself, by being separately fabricated, is readily accessible for making connections between its parts and for mounting equipment thereon. It can be quickly assembled and can easily be removed to give full access to the motor and related parts or for repair of the front end assembly itself.

While one embodiment of the invention has been described for purposes of illustration it is to be understood that there may be various embodiments and modifications within the general scope of the invention.

What is claimed is:
1. An automobile body construction of the unit body type, comprising in combination, a main body assembly including stub front rails for carrying motor and accessories, and front wheel mounts, said main body assembly also including rear components of front wheel housings secured to said stub rails; a front end assembly including a rigid transverse stamping providing mountings thereon for radiator, grill and headlamps and space for mounting a bumper, said front end assembly having on each side a front component of a front wheel housing and supporting means carried by said front wheel housing component overlapping said stub front rail, and means for securing said supporting means to said stub front rails, said supporting means comprising Z-shaped gussets secured by a top web flange to said front wheel housing component, secured by a lower web and web flanges to said transverse stamping, and having a plate secured to its top web and to said transverse stamping.

2. An automobile body construction of the unit body type, comprising in combination, a main body assembly including stub front rails having portions thereof projecting forward beyond the front wheel mounts and adapted to carry front wheel mounts, motor mounts and accessory mounts, rear components of front wheel housings secured to said stub front rails and extending forward approximately to the wheel mount location; a front end assembly including a rigid transverse frame having an interior grill opening and having interior and exterior peripheral rearwardly extending flanges, said front end assembly on each side having a front component of a front wheel housing extending rearwardly approximately to said front wheel mount location, said front components being secured to the rearwardly extending flanges of said transverse frame and carrying elements telescopically embracing and secured to the projecting portions of said stub front rails.

3. An automobile body construction of the unit body type, comprising in combination, a main body assembly including stub front rails having portions thereof projecting forward beyond the front wheel mounts and adapted to carry front wheel mounts, motor mounts and accessory mounts, rear components of front wheel housings secured to said stub front rails and extending forward approximately to the wheel mount location; a front end assembly including a rigid transverse frame having an interior grill opening and having interior and exterior peripheral rearwardly extending flanges, said front end assembly on each side having a front component of a front wheel housing extending rearwardly approximately to said front wheel mount location, said front components being secured to the rearwardly extending flanges of said transverse frame and carrying elements telescopically embracing and secured to the projecting portions of said stub front rails, said front components and said rear components of the front wheel housing having parts at the top, which overlap, and said front and rear components being spaced apart below the top on the sides to provide space for through passage of air at the front wheel mount location.

4. An automobile body construction of the unit body type, comprising in combination, a main body assembly including stub front rails having portions thereof projecting forward beyond the front wheel mounts and adapted to carry front wheel mounts, motor mounts and accessory mounts, rear components of front wheel housings secured to said stub front rails and extending forward approximately to the wheel mount location; a front end assembly including a rigid transverse frame having an interior grill opening and having interior and exterior peripheral rearwardly extending flanges, said front end assembly on each side having a front component of a front wheel housing extending rearwardly approximately to said front wheel mount location, said front components being secured to the rearwardly extending flanges of said transverse frame and carrying elements telescopically embracing and secured to the projecting portions of said stub front rails, said elements including the lower edge of said front components and Z-shaped gussets secured to the front components and having webs embracing other sides of the stub front rails, the bottom rearwardly extending flange of said transverse frame engaging the bottom of the front ends of the stub front rails and, with other parts forming complete circumferential enclosures for the front ends of said stub rails.

References Cited in the file of this patent
UNITED STATES PATENTS

| | | |
|---|---|---|
| 2,234,781 | Schjolin | Mar. 11, 1941 |
| 2,612,233 | Newell | Sept. 30, 1952 |
| 2,715,448 | Zeeb | Aug. 16, 1955 |
| 2,827,327 | Lindsay | Mar. 18, 1958 |
| 2,954,998 | Kushler et al. | Oct. 4, 1960 |
| 2,955,870 | Richards | Oct. 11, 1960 |